UNITED STATES PATENT OFFICE.

WILLARD H. FURNESS, OF QUINCY, ILLINOIS.

IMPROVEMENT IN COACH AND FURNITURE VARNISH.

Specification forming part of Letters Patent No. 34,232, dated January 21, 1862.

*To all whom it may concern:*

Be it known that I, WILLARD H. FURNESS, of Quincy, in the county of Adams and State of Illinois, have invented or discovered a new and useful improvement in making varnish out of coal-oil and other ingredients, which will be hereinafter mentioned; and I do hereby declare that the following is a full, clear, and exact description of the ingredients and the manner of using the same, together with such proportions of each ingredient as will enable any one skilled in the art to make and use the varnish in question.

To five gallons of coal-oil, kerosene, or other oil distilled from mineral coal, I add as follows: five (5) pounds of gum-dammar, two (2) pounds of resin, half ($\frac{1}{2}$) a pound of gum-frankincense, one and a half ($1\frac{1}{2}$) pound of yellow wax, and one (1) pound of borax.

The above-named quantity of coal-oil will cut, generally, the above quantity of crude matter, but if it will not, then a little more may be added.

Of the above-named ingredients it may be proper to add that for coach and furniture varnish coal-oil has not, so far as I can learn, ever been used before I used it. Gum-dammar has been used to form the body of such varnishes. Rosin has been tried, but its use abandoned, because the other ingredients of the varnish did not neutralize its tendency to crack, and it was therefore injurious to the varnish, though it made a good body for it. The gum-frankincense I use solely to neutralize the smell of the coal-tar or kerosene. The beeswax not only adds to the surface polish and to its durability, but, together with the coal-oil, prevents the rosin from cracking, and thus enables me to use rosin advantageously in making such varnishes. The borax is for hardening the varnish, and has been previously used in varnishes.

Gum-copal may be used with the above compound but it is a varnish without the copal. When the copal is used it should be dissolved in benzole by putting both the gum and the benzole in a vessel and putting the vessel in a hot-water bath until the gum is dissolved, and then it can be readily mixed with the varnish.

I can use with my varnish any of the well-known driers, such as sugar of lead, litharge, and other drying material. I have named two pounds of rosin as the quantity to be used with five gallons of coal-oil. As the rosin darkens the varnish, more or less of it must or may be be used, in accordance with the purpose to which the varnish is to be applied. Yellow wax has not, so far as I can learn, been used in coach or furniture varnish; and this article and the coal-oil are believed to be new in this use as ingredients for varnish. The coal-oil having been heated, the other ingredients, except the wax, are introduced and mixed, and afterward the wax may be introduced.

Having thus fully described my invention, what I claim, and desire to secure by Letters Patent, is—

The use of coal-oil or kerosene and yellow wax as ingredients in the making of coach or furniture varnish out of the ordinary gums and driers used for this purpose, and as herein set forth.

WILLARD H. FURNESS.

Witnesses:
A. B. STOUGHTON,
HARRY W. PRICE.